3,249,736
ARC WELDING
Takuro Kobayashi, 23—3 Nagamine, Nagamachi, Sendai-shi, Japan, and Keizo Tezuka, 1090 Toyoda, Hinoma-chi, Minamitamagun, Tokyo, Japan
No Drawing. Filed Jan. 10, 1964, Ser. No. 336,865
Claims priority, application Japan, Jan. 12, 1963,
38/1,175, 38/1,176
15 Claims. (Cl. 219—137)

The present invention relates to arc welding, and more particularly to wire electrode compositions for metal-arc welding in which the electrode is consumed during use, and to methods of arc welding in which the metal is consumed during welding.

In metal-arc welding, the arc occurs between the work to be welded and a metallic wire which acts as the electrode. Under the intense heat developed, the area of the work to be welded wherein the arc has occurred is brought to the melting point, almost instantaneously, and the tip of the metallic wire electrode is likewise melted, tiny globules of the melted metallic wire being forced across the arc and depositing in the molten seat.

Since the molten steel has a strong affinity for oxygen and nitrogen, it will, when exposed to the air, enter into chemical combination with the oxygen and nitrogen of the air to form oxides and nitrides in the steel. These impurities tend to weaken and embrittle the steel as well as to lessen its resistance to corrosion. Moreover, when carrying out metal-arc welding in air, using steel wire as the consumable electrode, many air holes or pores are formed in the welded metal, thus resulting in a defective weld. This is due to the fact that a small mass of fused steel from the end of the electrode or base metal fused together with the small mass absorbs a large amount of nitrogen and oxygen in the air, which gases or products thereof are not all discharged upon solidification. Consequently, the same form pores.

In order to avoid this disadvantage of metal-arc welding, a method of shielded-arc welding has been developed in which the arc is shielded from contact with the ambient atmosphere, for example by completely enveloping it with an inert gas which will not enter into chemical combination with the molten metal and which at the same time prevents its contact with the atmospheric oxygen and nitrogen.

Another method of welding to avoid the disadvantages of the unshielded metal-arc welding discussed above is the arc welding method wherein the welding is carried out in a envelope of a flux composition which is previously applied to the portion of the workpiece to be welded. This acts similarly to the gas shielded-arc welding in which the inert gases are directed toward and around the arc to envelope the welding in an envelope or shield of these gases.

While these methods have succeeded in producing welds which are free of pores, the welding operations using the shielded-arc welding is quite complicated in comparison to the non-shielded metal-arc welding, using the steel wire as consumable electrode, since coating material, fusing agent or shielding gases must be employed in the shielded-arm welding methods to envelope the molten steel in order to prevent the same from contacting the ambient air and being damaged as a result thereof.

It is quite apparent, therefore, that if it were possible to provide a non-shielded metal-arc welding, while still avoiding the development of pores in the weld, this would constitute a considerable advance in the art.

It is accordingly a primary object of the present invention to provide for metal-arc welding without shielding, yet resulting in the formation of a sound, faultless weld, that is a weld which is substantially completely free of pores.

It is another object of the present invention to provide for a special wire composition for the metallic wire used in metal-arc welding, which, when used in such welding can be used without shielding and nevertheless, results in welds which are completely free of pores.

It is still another object of the present invention to provide for a method of metal-arc welding without shielding of the electrode and the arc, to obtain all of the advantages of unshielded metal-arc welding, with the simultaneous advantages of shielded metal-arm welding.

Other objects and advantages of the present invention will be apparent from a further reading of the specification and of the appended claims.

With the above and other objects in view, the present invention mainly comprises as a steel electrode for metal-arc welding, the use of a steel containing less than about 0.3% by weight of carbon, and containing as denitrogenizing and deoxidizing agent a substance selected from the group consisting of zirconium and a mixture of zirconium and titanium, said zirconium being present in an amount of at least 0.1% by weight and the total amount of said substance being more than about 0.25% by weight and less than about 2.5% by weight.

Preferably the amount of zirconium is at least about 0.15% by weight, and the total amount of the substance (either zirconium alone or a mixture of zirconium and titanium) is less than about 2.0% by weight.

Thus, if zirconium is used alone, that is not in admixture with titanium, the steel should contain less than about 0.3% by weight of carbon, and should contain zirconium in an amount of more than about 0.25% by weight and less than about 2.5% by weight, preferably less than about 2.0% by weight.

On the other hand, if a mixture of zirconium and titanium is used, the steel for the wire electrode which is consumed during the metal-arc welding should contain less than about 0.3% by weight of carbon, and contain the zirconium and titanium in a total amount of more than about 0.25% by weight and less than about 2.5% by weight, preferably less than about 2.0% by weight, and the zirconium should be present in an amount of at least about 0.1% by weight, preferably at least about 0.15% by weight.

It has been found according to the present invention that in order to inhibit the formation of pores in the metal being welded, when carrying out the welding by metal-arc welding without shielding, using a steel wire electrode which is consumed during the metal-arc welding, that it is necessary to consider primarily the actions of nitrogen and oxygen, which are the main components of air. Most important, the influence of nitrogen cannot be minimized.

In accordance with the present invention the non-shielded metal-arc welding method ensures faultless welds of low nitrogen content and having no pores, using a bare steel wire electrode, and this is due to the presence of the zirconium or the zirconium and titanium, to act as forceful denitrogenizing agent.

In accordance with the method of the present invention, when using as the steel wire electrode for metal-arc welding, without shielding, a steel which contains less than about 0.3% by weight of carbon and contains zirconium or a mixture of zirconium and titanium, in the amounts set forth above, the zirconium or the zirconium and titanium act as forceful denitrogenizing agents, whereby nitrogen entering the molten steel from the air combines with the denitrogenizing agent and is separated as a slag on the surface of the welded metal. By operating in this manner, the nitrogen content of the welded metal is greatly reduced, and the welded metal, quite importantly, contains substantially no pores.

Zirconium and titanium are not only forceful denitrogenizing substances, but also forceful deoxidizing substances. In particular, zirconium has a strong deoxidizing action. In the case wherein oxygen and nitrogen coexist with each other in the metal being welded, it is believed that the zirconium as well as the titanium will act and be consumed first as a deoxidizing agent and then the remaining portion thereof will act as a denitrogenizing agent.

Accordingly, if the steel containing zirconium and titanium in excess above the amount necessary for denitrogenization is employed as wire electrode in the non-shielded metal-arc welding method, deoxidation can be carried out effectively, even though oxygen which constitutes 20% of the air will enter into the molten metals being welded. Consequently, formation of any pores due to the oxygen can be eliminated. Of course, the effective denitrogenizing action also assures the prevention of any pores due to nitrogen being formed.

It is therefore apparent, that in the non-shielded metal-arc welding in which steel containing zirconium or zirconium and titanium in an effective amount for the denitrogenization is used as wire electrode, a sound weld free of pores can be obtained. Furthermore, it has been found that while the arc in metal-arc welding is generally unstable in prior unshielded welding using bare steel wire as the consumable electrode, if the steel wire electrode of the present invention is used without shielding, that is the steel wire electrode containing zirconium alone or zirconium plus titanium, these substances, in addition to acting as denitrogenizing and deoxidizing agents and thereby preventing the formation of pores in the weld, also act to stabilize the arc so that the welding operation can be carried out more easily and more safely.

In the unshielded metal-arc welding according to the present invention using as the consumable steel electrode a steel of less than about 0.3% of carbon and containing either zirconium alone or a mixture of zirconium and titanium in which the zirconium is present in an amount of at least about 0.1% by weight and in which the total of the zirconium alone or the zirconium and titanium is more than about 0.25% by weight and less than about 2.5% by weight, the formation of pores in the welded metal is considerably reduced. It has been found in accordance with the present invention that the lower limit of the content of denitrogenizing substance (zirconium alone or zirconium plus titanium) required for the effective denitrogenization is about 0.25% in unshielded metal-arc welding according to the present invention. As the content of denitrogenizing substance or substances is increased, the effect becomes better and better, corresponding to the increase. However, if the content exceeds about 2.0%, the fluidity of the molten steel is reduced and the gas charge tends to be difficult, so that the formation of pores may occur in a reversed effect. At 2.5% by weight, total, of zirconium or zirconium plus titanium, the effect is entirely undesirable, so that this is the absolute maximum percentage of denitrogenizing and deoxidizing agent. Preferably the maximum percentage is not more than about 2.0% by weight.

The following example, which actually constitutes 13 examples, as set forth in the tables below, is given to more fully set forth the present invention. The scope of the invention is not, however, meant to be limited to the specific details of the example.

EXAMPLE

Steel electrodes for unshielded metal-arc welding, containing less than 0.3% of carbon and containing zirconium alone or zirconium plus titanium were prepared, as were steel electrodes which were free of zirconium and titanium or which contained only titanium and no zirconium, and metal-arc welding was carried out using these consumable electrodes. Table 1 below shows the chemical compositions of the 13 steel electrodes which were prepared and tested.

Table 1.—Chemical composition of consumable steel wire electrode employed in unshielded metal-arc welding

| Electrode No. | C | Mn | Si | Zr | Ti | Remarks |
|---|---|---|---|---|---|---|
| No. 1 | 0.09 | 0.62 | 0.03 | | | Core wire of coated metal arc welding electrode. |
| No. 2 | 0.08 | 1.70 | 0.75 | | 0.15 | Steel wire for gas-shielded metal-arc welding. |
| No. 3 | 0.05 | 0.80 | 0.25 | 0.20 | | Zirconium content below minimum. |
| No. 4 | 0.06 | 0.75 | 0.21 | 0.25 | | Preferred electrodes according to the present invention containing only zirconium. |
| No. 5 | 0.04 | 0.63 | 0.18 | 0.38 | | |
| No. 6 | 0.03 | 0.63 | 0.16 | 0.55 | | |
| No. 7 | 0.09 | 0.72 | 0.22 | 0.78 | | |
| No. 8 | 0.05 | 0.71 | 0.33 | 1.72 | | |
| No. 9 | 0.06 | 0.75 | 0.25 | 2.50 | | Zirconium content in excess. |
| No. 10 | 0.05 | 0.75 | 0.30 | 0.15 | 0.16 | Preferred electrodes according to the present invention containing zirconium and titanium. |
| No. 11 | 0.04 | 0.67 | 0.22 | 0.20 | 0.20 | |
| No. 12 | 0.08 | 0.65 | 0.25 | 0.25 | 0.35 | |
| No. 13 | 0.06 | 0.61 | 0.19 | | 0.53 | Containing only Ti. |

Table 2 below shows a comparison of the number of pores formed in the welding of rimmed mild steel plate by means of direct current welding apparatus, using nine welding steel wires according to the present invention (electrodes Nos. 4 to 8, and Nos. 10 to 12), using steel wire electrode for gas-shielded arc welding (No. 2), steel wire for arc welding coated metal arc welding (No. 1), steel wire electrode for welding containing zirconium in an amount less than the minimum of the present invention (No. 3), steel welding wire electrode containing zirconium in an amount more than the maximum amount according to the present invention (No. 9) and steel wire welding electrode containing only titanium (No. 13).

When using electrode No. 1, which contained no zirconium or titanium, innumerable pores were produced in the weld.

Although electrode No. 2 contained silicon in a large amount and titanium in a small amount as deoxidizing agent, a small amount of titanium acted mainly as deoxidizing agent without exhibiting any particular denitrogenizing action. Consequently, the weld contained many pores.

Electrode No. 3 did contain zirconium, however, since its content was less than the minimum of the present invention, considerable pores were formed in the weld.

Electrode No. 9 contained zirconium in an amount greater than the maximum amount according to the present invention. The deoxidizing and denitrogenizing actions were excellent. However, the fluidity of the fused steel was reduced, so that despite the deoxidizing and denitrogenizing action, a considerable number of pores were formed.

Electrode No. 9 contained titanium only, in a relatively large amount. Considerable pores were formed in the weld despite the relatively large content of titanium.

Accordingly, electrodes Nos. 1, 2, 3, 9 and 13 cannot be used for unshielded metal-arc welding, due to the formation of welds containing an undesirable number of pores.

Electrodes Nos. 4 and 8, which contained the zirconium at amounts approaching the limits of the present invention resulted in welds with a small number of pores. Although there were some pores in the welds, the number was not too high, and the welds could satisfactorily be used. Consequently these electrodes can be used for unshielded metal-arc welding.

Electrodes 5 to 7 and 10 to 12, which contained the zirconium or the zirconium and titanium in preferred amounts in accordance with the present invention resulted in welds which were entirely free of pores.

These tests therefore show the effectiveness of using zirconium alone or zirconium in combination with titanium as denitrogenizing and deoxiding agent in steel wire electrodes for unshielded metal-arc welding.

*Table 2.—Conditions for unshielded metal-arc welding and number of pores*

| Electrode No. | Diameter of electrode (mm.) | Welding current (A) | Arc voltage (V) | Feeding rate, m./min. | Number of pores per 10 cm. of welded metal |
|---|---|---|---|---|---|
| No. 1 | 1.6 | 200 | 32 | 3.5 | innumerable |
| No. 2 | 1.6 | 200 | 32 | 3.5 | 98 |
| No. 3 | 1.6 | 200 | 32 | 3.5 | 20 |
| No. 4 | 1.6 | 200 | 32 | 3.5 | 6 |
| No. 5 | 1.6 | 200 | 32 | 3.5 | 0 |
| No. 6 | 1.6 | 200 | 32 | 3.5 | 0 |
| No. 7 | 1.6 | 200 | 32 | 3.5 | 0 |
| No. 8 | 1.6 | 200 | 32 | 3.5 | 9 |
| No. 9 | 1.6 | 200 | 32 | 3.5 | 25 |
| No. 10 | 1.6 | 200 | 32 | 3.5 | 0 |
| No. 11 | 1.6 | 200 | 32 | 3.5 | 0 |
| No. 12 | 1.6 | 200 | 32 | 3.5 | 0 |
| No. 13 | 1.6 | 200 | 32 | 3.5 | 18 |

Table 3 shows the nitrogen contents of the welded metals obtained by the unshielded metal-arc welding in which electrodes Nos. 1 to 13 were used. As is apparent from Table 3, considerable reduction in the nitrogen content of the welded metal was obtained when using the steel wire electrode containing the denitrogenizing agent in accordance with the present invention.

*Table 3.—Nitrogen content of welded metal according to non-shielded arc welding*

| Electrode No. | Nitrogen content of welded metal (soluble nitrogen), weight percent |
|---|---|
| No. 1 | 0.162 |
| No. 2 | not measured |
| No. 3 | 0.085 |
| No. 4 | 0.081 |
| No. 5 | 0.065 |
| No. 6 | 0.056 |
| No. 7 | 0.042 |
| No. 8 | 0.040 |
| No. 9 | 0.040 |
| No. 10 | 0.075 |
| No. 11 | 0.072 |
| No. 12 | 0.075 |
| No. 13 | 0.065 |

It is clear from the above results that by the use of steel wire electrodes containing denitrogenizing agents in accordance with the present invention within the ranges of the present invention, sound, faultless welds which are substantially or completely free of pores and which have a relatively low nitrogen content are obtained by unshielded metal-arc welding. It should further be noted that it is necessary in accordance with the present invention to maintain the carbon content of the steel for the electrode at below 0.3% because higher carbon contents might result in cracking of the welded portion, thus rendering the weld unusable.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Steel wire electrode for metal-arc welding, said steel containing less than about 0.3% by weight of carbon, and containing as denitrogenizing and deoxidizing agent a substance selected from the group consisting of zirconium and a mixture of zirconium and titanium, said zirconium being present in an amount of at least about 0.1% by weight and the total amount of said substance being more than about 0.25% by weight and less than about 2.5% by weight.

2. Steel wire electrode for metal-arc welding, said steel containing less than about 0.3% by weight of carbon, and containing as denitrogenizing and deoxidizing agent a substance selected from the group consisting of zirconium and a mixture of zirconium and titanium, said zirconium being present in an amount of at least about 0.1% by weight and the total amount of said substance being more than about 0.25% by weight and less than about 2.0% by weight.

3. Steel wire electrode for metal-arc welding, said steel containing less than about 0.3% by weight of carbon, and containing zirconium in an amount of more than about 0.25% by weight and less than about 2.5% by weight.

4. Steel wire electrode for metal-arc welding, said steel containing less than about 0.3% by weight of carbon, and containing zirconium in an amount of more than about 0.25% by weight and less than about 2.0% by weight.

5. Steel wire electrode for metal-arc welding, said steel containing less than about 0.3% by weight of carbon, and containing zirconium and titanium in a total amount of more than about 0.25% by weight and less than about 2.5% by weight, the amount of said zirconium being at least 0.1% by weight.

6. Steel wire electrode for metal-arc welding, said steel containing less than about 0.3% by weight of carbon, and contaning zirconium and titanium in a total amount of more than about 0.25% by weight and less than about 2.0% by weight, the amount of said zirconium being at least 0.15% by weight.

7. Steel wire electrode for metal-arc welding, said steel wire having a composition of about 0.05% by weight of carbon, 0.75% by weight of manganese, 0.30% by weight of silicon, 0.15% by weight of zirconium, 0.16% by weight of titanium, and the balance iron.

8. Steel wire electrode for metal-arc welding, said steeel wire having a composition of about 0.04% by weight of carbon, 0.67% by weight of manganese, 0.22% by weight of silicon, 0.20% by weight of zirconium, 0.20% by weight of titanium, and the balance iron.

9. Steel wire electrode for metal-arc welding, said steel wire having a composition of about 0.08% by weight of carbon, 0.65% by weight of manganese, 0.25% by weight of silicon, 0.25% by weight of zirconium, 0.35% by weight of titanium, and the balance iron.

10. In a method of welding a workpiece by metal-arc welding using a consumable steel electrode therefor, the improvement which comprises using as said consumable electrode a steel wire electrode containing less than about 0.3% by weight of carbon, and containing as denitrogenizing and deoxidizing agent a substance selected from the group consisting of zirconium and a mixture of zirconium and titanium, said zirconium being present in an amount of at least about 0.1% by weight and the total amount of said substance being more than about 0.25% by weight and less than about 2.5% by weight, and carrying out said welding in air without shielding of the arc so that the arc and weld are exposed to the ambient atmosphere, whereby a fault-free, non-porous weld is obtained despite the contact of the weld during welding with the oxygen and nitrogen of the air.

11. In a method of welding a workpiece by metal-arc welding using a consumable steel electrode therefor, the improvement which comprises using as said consumable electrode a steel wire electrode containing less than about 0.3% by weight of carbon, and containing as denitrogenizing and deoxidizing agent a substance selected from the group consisting of zirconium and a mixture of zirconium and titanium, said zirconium being present in an amount of at least about 0.1% by weight and the total amount of said substance being more than about 0.25% by weight and less than about 2.0% by weight, and carrying out said welding in air without shielding of the arc so that the arc and weld are exposed to the ambient atmosphere, whereby a fault-free, non-porous weld is obtained despite the contact of the weld during welding with the oxygen and nitrogen of the air.

12. In a method of welding a workpiece by metal-arc welding using a consumable steel electrode therefor, the improvement which comprises using as said consumable electrode a steel wire containing less than about 0.3% by weight of carbon, and containing zirconium in an amount of more than about 0.25% by weight and less than about 2.5% by weight, and carrying out said welding in air without shielding of the arc so that the arc and weld are exposed to the ambient atmosphere, whereby a fault-free, non-porous weld is obtained despite the contact of the weld during welding with the oxygen and nitrogen of the air.

13. In a method of welding a workpiece by metal-arc welding using a consumable steel electrode therefor, the improvement which comprises using as said consumable electrode a steel wire electrode containing less than about 0.3% by weight of carbon, and containing zirconium in an amount of more than about 0.25% by weight and less than about 2.0% by weight, and carrying out said welding in air without shielding of the arc so that the arc and weld are exposed to the ambient atmosphere, whereby a fault-free, non-porous weld is obtained despite the contact of the weld during welding with the oxygen and nitrogen of the air.

14. In a method of welding a workpiece by metal-arc welding using a consumable steel electrode therefor, the improvement which comprises using as said consumable electrode a steel wire electrode containing less than about 0.3% by weight of carbon, and containing zirconium and titanium in a total amount of more than about 0.25% by weight and less than about 2.5% by weight, the amount of said zirconium being at least 0.1% by weight, and carrying out said welding in air without shielding of the arc so that the arc and weld are exposed to the ambient atmosphere, whereby a fault-free, non-porous weld is obtained despite the contact of the weld during welding with the oxygen and nitrogen of the air.

15. In a method of welding a workpiece by metal-arc welding using a consumable steel electrode therefor, the improvement which comprises using as said consumable electrode a steel wire electrode containing less than about 0.3% by weight of carbon, and containing zirconium and titanium in a total amount of more than about 0.25% by weight and less than about 2.0% by weight, the amount of said zirconium being at least 0.15% by weight, and carrying out said welding in air without shielding of the arc so that the arc and weld are exposed to the ambient atmosphere, whereby a fault-free, non-porous weld is obtained despite the contact of the weld during welding with the oxygen and nitrogen of the air.

References Cited by the Examiner

UNITED STATES PATENTS

| | | | |
|---|---|---|---|
| 1,954,297 | 4/1934 | Keir | 219—137 |
| 2,824,948 | 2/1958 | Willigen | 219—74 |

FOREIGN PATENTS

| | | |
|---|---|---|
| 135,672 | 11/1933 | Austria. |

RICHARD M. WOOD, *Primary Examiner.*